United States Patent
Gaur

(10) Patent No.: US 7,286,549 B2
(45) Date of Patent: Oct. 23, 2007

(54) METHOD, SYSTEM, AND PROGRAM FOR PROCESSING DATA PACKETS IN PACKET BUFFERS

(75) Inventor: Daniel R. Gaur, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1020 days.

(21) Appl. No.: 10/283,954

(22) Filed: Oct. 30, 2002

(65) Prior Publication Data
US 2004/0085977 A1 May 6, 2004

(51) Int. Cl.
H04L 12/28 (2006.01)
(52) U.S. Cl. .................................... 370/412
(58) Field of Classification Search ............ None
See application file for complete search history.

(56) References Cited

U.S. PATENT DOCUMENTS

| | | | | |
|---|---|---|---|---|
| 5,400,326 A | * | 3/1995 | Smith | 370/401 |
| 5,828,653 A | * | 10/1998 | Goss | 370/230 |
| 6,404,768 B1 | * | 6/2002 | Basak et al. | 370/395.7 |
| 6,463,068 B1 | * | 10/2002 | Lin et al. | 370/414 |
| 6,603,759 B1 | * | 8/2003 | Moskal et al. | 370/352 |
| 6,680,906 B1 | * | 1/2004 | Nguyen | 370/229 |
| 6,700,871 B1 | * | 3/2004 | Harper et al. | 370/235 |
| 2006/0050723 A1 | * | 3/2006 | Yu | 370/412 |

OTHER PUBLICATIONS

Cisco Systems, Inc., "iSCSI Protocol Concepts and Implementation", *White Paper*, © 2001 Cisco Systems, Inc., pp. 1-12.
Microsoft Corporation, "Network Drivers:Windows 2000 DDK", *MSDN Library*, built Nov. 1999, pp. 1-1426.

* cited by examiner

*Primary Examiner*—Andrew C. Lee
(74) *Attorney, Agent, or Firm*—Molly A. McCall

(57) ABSTRACT

Provided are a method, system, and program for processing packets of data. An available packet buffer in memory is allocated to a received packet, wherein the received packet is stored in the allocated packet buffer. A determination is made as to whether a number of available packet buffers is less than a first threshold. A further determination is made as to whether the number of available packet buffers is less than a second threshold if the number of available packet buffers is not less than the first threshold. An operation is initiated to copy the received packet from the allocated packet buffer to a copy buffer if the number of available packet buffers is less than the second threshold.

28 Claims, 3 Drawing Sheets

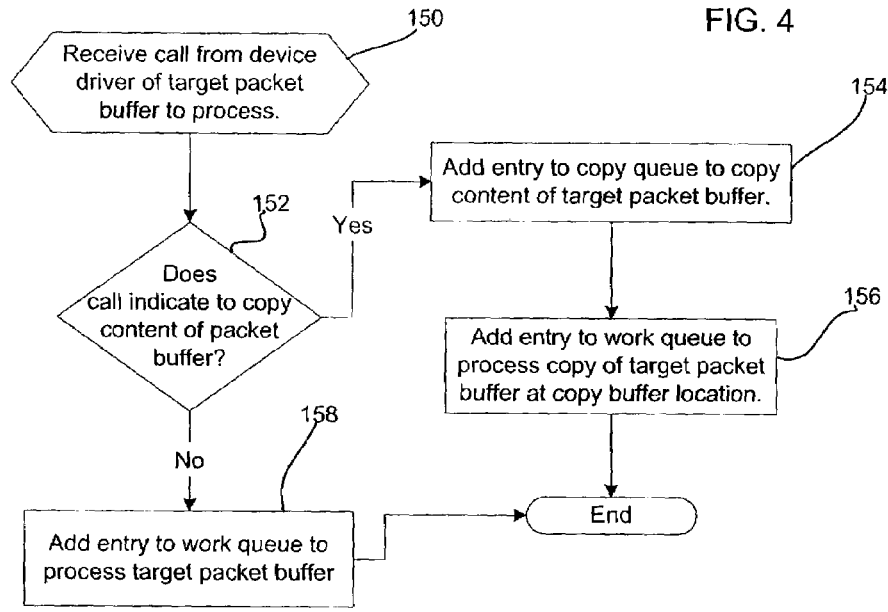
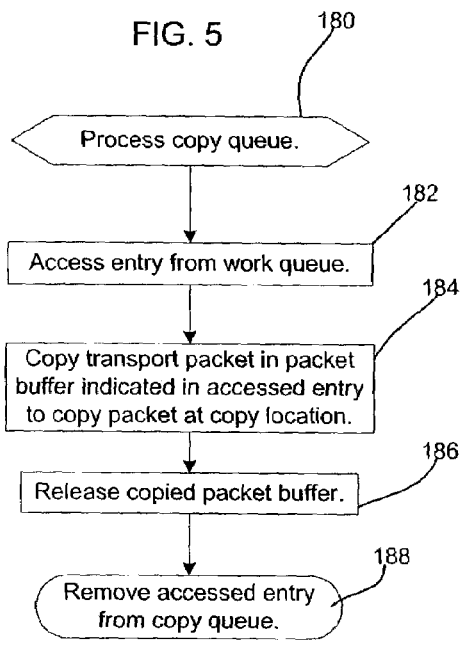
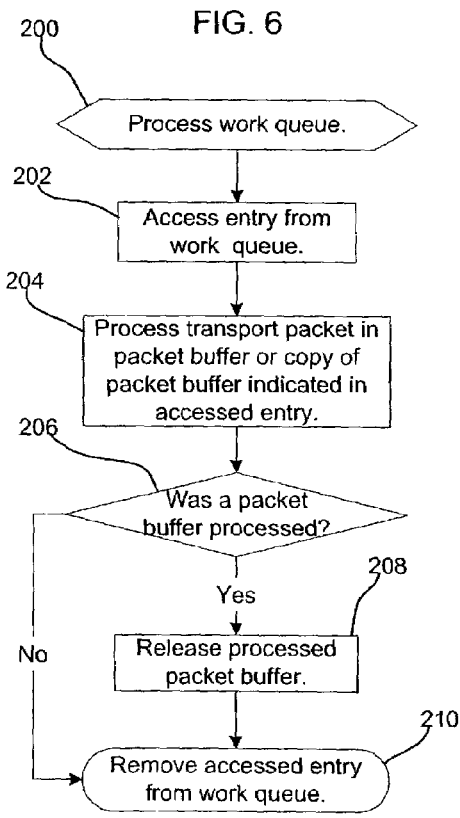

US 7,286,549 B2

METHOD, SYSTEM, AND PROGRAM FOR PROCESSING DATA PACKETS IN PACKET BUFFERS

BACKGROUND OF THE INVENTION

1. Field of the Invention

The present invention relates to a method, system, and program for processing data packets in packet buffers.

2. Description of the Related Art

In a network environment, a network adaptor card on a host computer, such as an Ethernet card, Fibre Channel card, etc., will receive Input/Output (I/O) requests or responses to I/O requests initiated from the host. Often, the host computer operating system includes a device driver to communicate with the network adaptor and make buffers in the host computer memory available to the network adaptor. Data packets received at the network adaptor would be stored in an available allocated packet buffer. The host computer further includes a transport protocol driver to process the packets received by the network adaptor that are stored in the packet buffer, and access any I/O commands or data embedded in the packet. For instance, the transport protocol driver may implement the Transmission Control Protocol (TCP) and Internet Protocol (IP) to decode and access the payload data in the TCP/IP packets.

In the prior art, the packet buffers store the packets from the network adaptor, that are received from a remote network/physical media, until the transport protocol driver processes the packet and releases the packet buffers. The released packet buffers are then available to receive any further packets from the network adaptor. If there are no available packet buffers for packets received at the network adaptor, then the network adaptor would have to discard such packets. All this discarded or "dropped" packets will have to be retransmitted, which wastes network bandwidth and degrades network performance. The prior art addresses this problem by having the protocol driver copy data from packet buffers to some other host memory or storage to release packet buffers and make them available to the network adaptor if the number of available packet buffers falls below a certain minimum threshold.

Notwithstanding the prior art techniques for ensuring that packet buffers are available for packets received at the network adaptor, there is a continued need for improved techniques to process packets in packet buffers, especially as improvements in network bandwidth increases the rate at which packets are received at the network adaptor. To accommodate the increased rate at which packets are received at the network adaptor, techniques are needed to improve the rate at which the transport protocol adaptor process packets received at the network adaptor.

BRIEF DESCRIPTION OF THE DRAWINGS

Referring now to the drawings in which like reference numbers represent corresponding parts throughout:

FIGS. 3, 4, 5, and 6 illustrate logic to process packets in packet buffers in accordance with embodiments of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
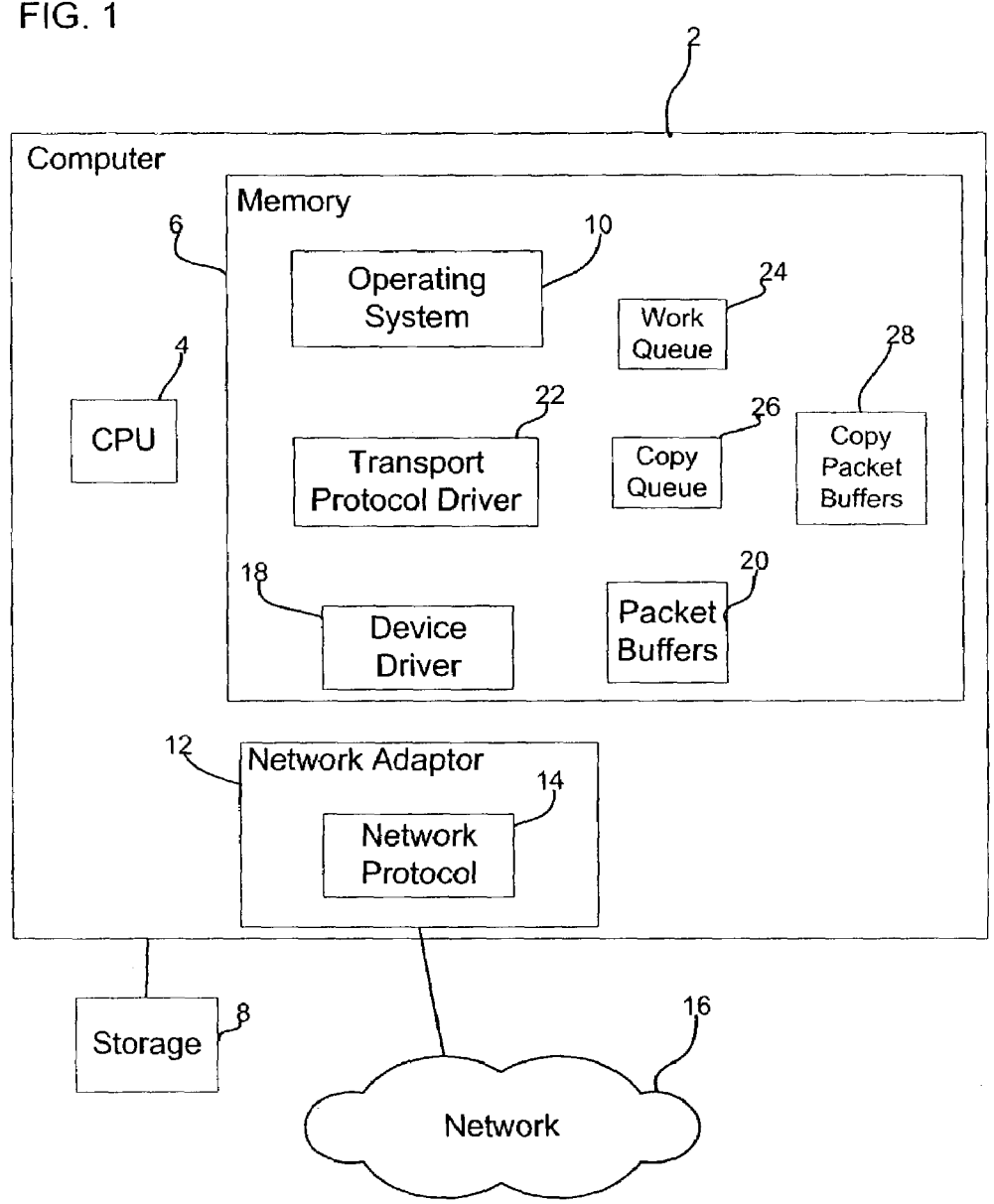
FIG. 1 illustrates a computing environment in which aspects of the invention are implemented.

FIG. 1 illustrates a computing environment in which aspects of the invention may be implemented. A computer 2 includes a central processing unit (CPU) 4, a volatile memory 6, non-volatile storage 8, an operating system 10, and a network adaptor 12. The computer 2 may comprise any computing device known in the art, such as a mainframe, server, personal computer, workstation, laptop, handheld computer, telephony device, network appliance, virtualization device, storage controller, etc. Any CPU 4 and operating system 10 known in the art may be used. The network adaptor 12 includes a network protocol 14 for implementing the physical communication layer to send and receive network packets to and from remote devices over a network 16. The network 16 may comprise a Local Area Network (LAN), the Internet, a Wide Area Network (WAN), Storage Area Network (SAN), etc. In certain embodiments, the network adaptor 12 and network protocol 14 may implement the Ethernet protocol, token ring protocol, Fibre Channel protocol, Infiniband, Serial Advanced Technology Attachment (SATA), parallel SCSI, serial attached SCSI cable, etc., or any other network communication protocol known in the art.

A device driver 18 executes in memory 6 and includes network adaptor 12 specific commands to communicate with the network adaptor 12 and interface between the operating system 10 and the network adaptor 12. The device driver 18 would allocate packet buffers 20 in memory 6 to store packets received at the network adaptor 12 from a remote network/physical media. In certain embodiments, each packet buffer would have a size equivalent to the largest possible size of a packet from the network adaptor 12 is capable of receiving. The network adaptor 12 transfers the contents of each packet received from the network 16 to one or more packet buffers 20 in host memory 6.

A transport protocol driver 22 executes in memory 6 and processes the content of messages included in the packets received at the network adaptor 12 that are wrapped in a transport layer, such as TCP and/or IP, Internet Small Computer System Interface (iSCSI), Fibre Channel SCSI, parallel SCSI transport, or any other transport layer protocol known in the art. In certain embodiments, the transport protocol driver 22 would process packets from the packet buffers 20. When completing processing of a packet buffer, the transport protocol driver 22 would immediately release the packet buffer 20 from which the packet was processed to the device driver 18, where the device driver 18 would immediately make the released packet buffer available to the network adaptor 12 to use for any further received packets.

The transport protocol driver 22 maintains a work queue 24, a copy queue 26 and copy packet buffers 28. The work queue 24 is used to queue tasks to process packets from the network adaptor 12 stored in a packet buffer 20. The copy queue 26 is used to queue a task to copy the content of a particular packet buffer 20 to a copy packet buffer 28 in the manner described below. The copy packet buffers 28 maintain copies of packets in the packet buffers 20 allocated by the device driver 18. The packet buffers 20 are copied to the copy packet buffers 28 when the number of available packet buffers 20 falls below one or more thresholds as described below. Once a packet buffer 20 is copied, it is released and made available for further packets received by the network adaptor 12. The copy packet buffers 28 may be implemented in the memory 6 or within non-volatile storage 8.

Figure 2:
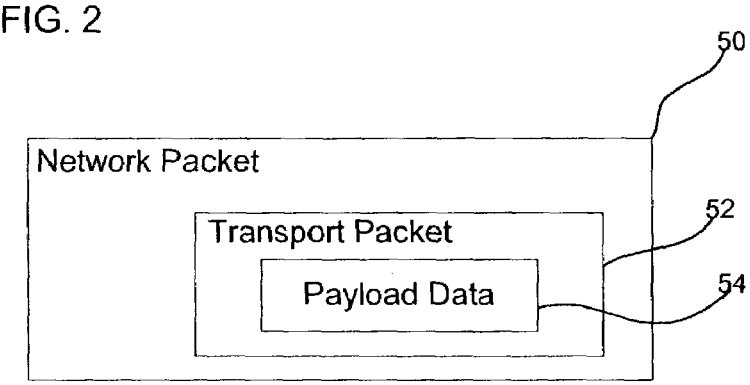
FIG. 2 illustrates a packet architecture used with embodiments of the invention.

FIG. 2 illustrates a format of a network packet 50 received at the network adaptor 12. The network packet 50 is implemented in a format understood by the network protocol 14, such as an Ethernet packet that would include additional Ethernet components, such as a header and error checking code (not shown). A transport packet 52 is included in the network packet 50. The transport packet may 52 comprise a transport layer capable of being processed by the transport protocol driver 22, such as the TCP and/or IP protocol, Internet Small Computer System Interface (iSCSI) protocol, Fibre Channel SCSI, parallel SCSI transport, etc. The transport packet 52 includes payload data 54 as well as other transport layer fields, such as a header and an error checking code. The payload data 52 includes the underlying content being transmitted, e.g., commands, status and/or data. The operating system may include a device layer, such as a SCSI driver (not shown), to process the content of the payload data 54 and access any status, commands and/or data therein.

Figure 3:
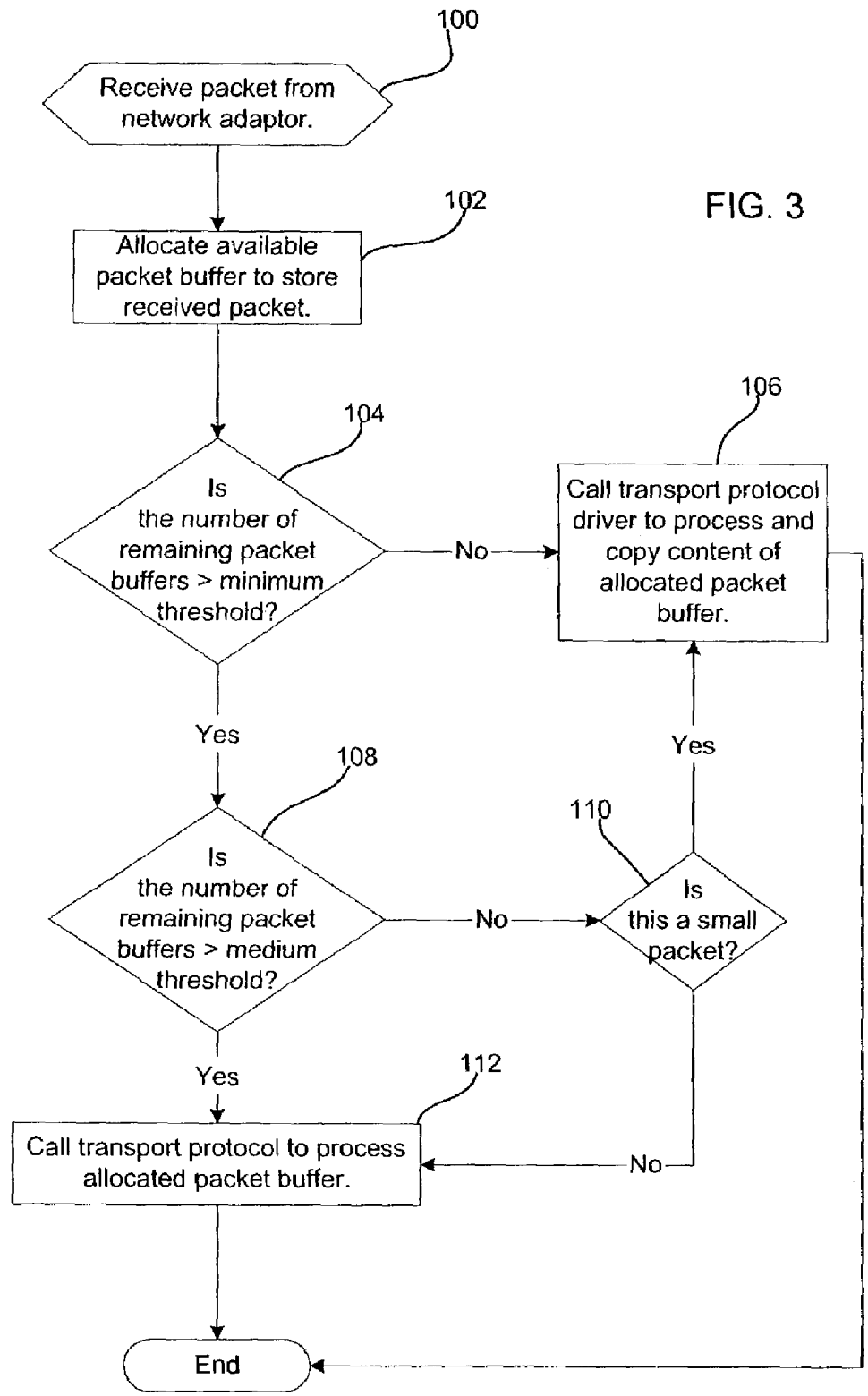

FIG. 3 illustrates logic implemented in the device driver 18 to process transport packets 52 from the network adaptor 12, where the network protocol 14 processes the network packet 50 to unpack and access the transport packet 52 that is encoded according to the transport protocol. Control begins at block 100 upon receiving a transport packet 52 to process. The device driver 18 allocates (at block 102) an available packet buffer 20 to store the received transport packet 52. If (at block 104) the number of remaining available packet buffers 20 is below a minimum threshold, then the device driver 18 calls (at block 106) the transport protocol driver 22 to process and copy the content of the allocated packet buffer to a copy packet buffer 28. If (at block 108) the number of remaining packet buffers is greater than a medium threshold and if (at block 110) the packet size is less than a small packet size threshold, then control proceeds to block 106 to call the transport protocol driver 2 to process and copy the content of the packet buffer 20. If the packet availability thresholds at blocks 104 and 108 and the packet size threshold at block 110 are not satisfied, then the device driver 18 calls (at block 112) the transport protocol driver 22 to process the allocated packet buffer 20 without copying the packet in the allocated packet buffer 20 to a copy packet buffer 28.

With the logic of FIG. 3, if there are too few packet buffers 20 available for use by the network adaptor 12, as determined by the minimum and medium thresholds, then the transport protocol driver 22 is called to copy the content of the next packet buffer to process to the copy packet buffer 28 and immediately release the packet buffer 20 to make that packet buffer available for use by the network adaptor 12. With the described logic of FIG. 3, the minimum threshold may be set to an absolute acceptable low of available packet buffers, such as twenty percent. When this minimum is reached, the transport protocol driver 22 copies the allocated packet buffer 20 regardless of the size of the packet.

The described embodiments provide an additional medium threshold for the purpose of trying to avoid reaching the minimum threshold where packets regardless of size are copied. The medium threshold of available packet buffers 20 is set to a level or range above the minimum threshold, such as 25% through 40%, where the minimum threshold may be less than 25%. Because the rate at which packets are received is based on the network packet traffic at the network adaptor 18, the occurrence of the packet availability reaching the minimum threshold may indicate heavy network utilization, of reaching the medium threshold may indicate a "medium" traffic utilization, and of not reaching either threshold value or range may indicate "light" network traffic utilization. If the minimum threshold is reached, then the transport protocol driver 22 only copies the packet if it is a relatively small packet. The determination of the "small" packet size may be a static decision or dynamically determined at runtime based on traffic patterns or CPU utilization.

The packet size threshold is used because the CPU 4 utilization required to copy a relatively small packet is substantially less than the CPU 4 resources required to copy a large packet. In this way, the described logic of FIG. 3 works to prevent the minimum threshold being reached by copying and releasing packet buffers that have a smaller size at a higher availability threshold so that the minimum threshold is not reached. This technique minimizes the use of computational resources to release packet buffers because the described technique preferably copies packets having a relatively smaller size, which utilizes less computational resources than if larger sized packets were copied at the minimum threshold. The described embodiments avoid the situation where the number of available packet buffers reaches the minimum threshold thereby triggering the use of higher levels of CPU 4 computational resources to copy relatively large sized packets to the copy packet buffer 28. Thus, by selectively copying the small packets, there is less likelihood that the minimum threshold will be reached.

Moreover, by minimizing the CPU 4 resources utilized to copy packets to release packet buffers 20, the described embodiments allows additional CPU 4 resources to be allocated to the transport protocol driver 22 to process packets 50, thereby increasing the speed at which the transport protocol driver 22 processes packets from the network adaptor 12. In this way, by allowing more computational resources to be allocated to the packet processing as opposed to packet buffer copying, the transport protocol driver 22 can accommodate the higher bandwidth of the network adaptor 12 and faster rate at which packets are received, including large bursts of traffic. Without improving the speed at which the transport protocol driver 22 processes packets, as network bandwidth increases, the network adaptor 12 will have to drop more packets because there is an increased likelihood that there will be no available packet buffers 20.

Yet further, storage capacity utilization is wasted when packet buffers 20 store small packets, substantially smaller than the packet buffer size 20. Thus, the described embodiment technique of releasing the packet buffers storing smaller packets improves storage capacity utilization by increasing the percentage of packet buffers utilizing a greater percentage of the space to store the packets.

FIGS. 4, 5, and 6 illustrate logic implemented in the transport protocol driver 22 to process transport packets 52 stored in the packet buffers 20 or copy packet buffers 28. As discussed, the transport protocol driver 22 wold process the transport packet 52 by performing error checking and other operations to access the payload data 54 or other data, status or commands transmitted from a remote system over the network 16 within a transport packet format, such as TCP and/or IP. With respect to FIG. 4, control begins at block 150 upon receiving a call from the device driver 18 to process a target packet buffer 20. If (at block 152) the call or a separate call indicates to copy the content of the target packet buffer 20, then the transport protocol driver 22 adds (at block 154)

an entry to the copy queue 26 to copy the packet in the target packet buffer 18 to a copy packet buffer 28 and adds (at block 156) an entry to the work queue 24 to process the copy of the packet at the copy packet buffers 28. Otherwise, if the call did not indicate to copy the content of the target packet buffer 18, then the transport protocol driver 22 adds an entry to the work queue 24 to process the target packet buffer 18. The transport protocol driver 22 may process the queues 24 and 26 on a First-In-First-Out (FIFO) basis or according to any other queue processing algorithm known in the art, including a priority based algorithm.

FIG. 5 illustrates logic implemented in the transport protocol driver 22 to process entries in the copy queue 26. When processing (at block 180) the copy queue 26, the transport protocol driver 22 will access (at block 182) an entry, according to a queuing algorithm known in the art, such as FIFO. The transport protocol driver 22 then copies (at block 184) the transport packet 52 from the packet buffer 20 identified in the entry to the copy packet buffers 28 and then immediately releases (at block 186) the packet buffer 18 from which the packet 52 was copied to immediately make the released packet buffer 18 available to the network adaptor 12. The processed copy entry is then removed (at block 188) from the copy queue 26.

FIG. 6 illustrates logic implemented in the transport protocol driver 22 to process entries in the work queue 24. When processing (at block 200) the work queue 24, the transport protocol driver 22 accesses (at block 202) an entry from the work queue 202 and processes (at block 204) the transport, packet 52 indicated in the accessed entry in the packet buffer 20 or copy packet buffers 28 if a copy of the packet was made. If (at block 206) the transport packet 52 was processed from the packet buffers 20, then the transport protocol driver 22 releases (at block 208) the packet buffer 20 from which the transport packet 52 was processed. If (at block 206) the transport packet 52 was processed from the copy packet buffers 28 (from the no branch of block 206) or after releasing the processed packet buffer 20, the processed entry is removed (at block 210) from the work queue 24.

ADDITIONAL EMBODIMENT DETAILS

The described techniques for processing packets of data may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, certain operations were described as being performed by the device driver 18 and transport protocol driver 22. In alterative embodiments, operations described as performed by the device driver 18 may be performed by the transport protocol driver 22, and vice versa.

In the described embodiments, two packet buffer availability thresholds and one size threshold were considered. In alternative embodiments, additional packet buffer availability and size thresholds may be considered in order to determine whether to initiate a copy operation to copy the packet from the packet buffers allocated by the device driver 18 to the network adaptor 12 to the copy packet buffers 28. For instance, an additional threshold may cause a copy operation if the availability of packet buffers is greater than the medium threshold but less than an additional threshold and if the packet size is less than a packet that is the same or less than the packet size considered with the second threshold at block 108 in FIG. 3. This is to allow the release of packet buffers by copying packets having an even smaller size, and hence requiring even less computational resources to copy, than packets less than the first size threshold.

In the described embodiments, the packets are received at a network adaptor card from a remote computer over a network. In alternative embodiments, the packets that are placed in the packet buffers and processed by the transport protocol driver may be received from a separate process executing in the same computer in which the device driver and transport protocol driver execute. In such embodiments, the network card is not used as the packets are passed between processes within the same computer and/or operating system.

The illustrated logic of FIGS. 3, 4, 5, and 6 show certain events occurring in a certain order. In alternative embodiments, certain operations may be performed in a different order, modified or removed. Morever, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing packets of data, comprising:
    allocating an available packet buffer in memory to a received packet, wherein the received packet is stored in the allocated packet buffer;
    determining whether a number of available packet buffers is less than a first threshold;

determining whether the number of available packet buffers is less than a second threshold if the number of available packet buffers is not less than the first threshold; and initiating an operation to copy the received packet from the allocated packet buffer to a copy buffer if the number of available packet buffers is less than the second threshold.

2. The method of claim 1, further comprising:
releasing the allocated packet buffer after copying the received packet to the copy buffer, wherein the released packet buffer is available to receive an additional packet.

3. The method of claim 1, further comprising:
initiating an operation to copy the received packet from the allocated packet buffer to a copy buffer if the number of available packet buffers is less than the first threshold.

4. The method of claim 1, further comprising:
determining whether a size of the received packet is less than a packet size threshold, wherein the operation to copy the received packet from the allocated packet buffer to the copy buffer if the number of available packet buffers is less than the second threshold is performed if the received packet size is less than the packet size threshold.

5. The method of claim 4, wherein the first threshold is less than the second threshold.

6. The method of claim 4, further comprising:
initiating an operation to copy the received packet from the allocated packet buffer to a copy buffer if the number of available packet buffers is less than the first threshold, wherein the received packet copied if the number of available packet buffers is less than the first threshold is capable of being greater than the packet size threshold.

7. The method of claim 1, further comprising:
processing the packets in the packet buffers and copy buffers lo access data in the packets; and
releasing the packet buffer including the processed packet to make the released packet buffer available for additional packets.

8. The method of claim 7, wherein the packets are received from a network adaptor and are encoded using a transport layer protocol, wherein processing the packet comprises using the transport layer protocol to access data within the packet.

9. The method of claim 8, wherein the accessed data comprises at least one of data, status and commands included in payload data encoded using a device layer protocol.

10. The method of claim 8, wherein the transport layer protocol is a member of a set of transport layer protocols comprising TCP, IP. iSCSI, Fibre Channel SCSI, and parallel SCSI transport.

11. A system for processing packets of data, comprising:
a processor;
a memory coupled to the processor;
at least one program executed by the processor in the memory to cause the processor to perform:
(i) allocating an available packet buffer in memory to a received packet, wherein the received packet is stored in the allocated packet buffer;
(ii) determining whether a number of available packet buffers is less than a first threshold;
(iii) determining whether the number of available packet buffers is less than a second threshold if the number of available packet buffers is not less than the first threshold; and
(iv) initiating an operation to copy the received packet from the allocated packet buffer to a copy buffer if the number of available packet buffers is less than the second threshold.

12. The system of claim 11, wherein the program executed by the processor further causes the processor to perform:
releasing the allocated packet buffer after copying the received packet to the copy buffer, wherein the released packet buffer is available to receive an additional packet.

13. The system of claim 11, wherein the program executed by the processor further causes the processor to perform:
initiating an operation to copy the received packet from the allocated packet buffer to a copy buffer if the number of available packet buffers is less than the first threshold.

14. The system of claim 11, wherein the program executed by the processor further causes the processor to perform:
determining whether a size of the received packet is less than a packet size threshold, wherein the operation to copy the received packet from the allocated packet buffer to the copy buffer if the number of available packet buffers is less than the second threshold is performed if the received packet size is less than the packet size threshold.

15. A computer readable medium containing code which, when executed by a processor, causes the processor to perform a method, the method comprising:
allocating an available packet buffer in memory to a received packet;
determining whether a number of available packet buffers is less than a first threshold;
determining whether the number of available packet buffers is less than second threshold if the number of available packet buffers is not less than the first threshold; and
initiating an operation to copy the received packet from the allocated packet buffer to a copy buffer if the number of available packet buffers is less than the second threshold.

16. The computer readable medium of claim 15, wherein initiating the operation to copy the received packet comprises calling a transport protocol driver to copy the received packet to the copy buffer.

17. The computer readable medium of claim 16, wherein the transport protocol driver releases the allocated packet buffer after copying the received packet to the copy buffer, wherein the released packet buffer is available to receive an additional packet.

18. The computer readable medium of claim 15, further comprising:
initiating an operation to copy the received packet from the allocated packet buffer to a copy buffer if the number of available packet buffers is less than the first threshold.

19. The computer readable medium of claim 15, further comprising:
determining whether a size of the received packet is less than a packet size threshold, wherein initiating the operation to copy the received packet from the allocated packet buffer to the copy buffer if the number of available packet buffers is less than the second threshold is performed if the received packet size is less than the packet size threshold.

20. The computer readable medium of claim 19, wherein the first threshold is less than the second threshold.

21. The computer readable medium of claim 20, wherein the packets are received from a network adaptor and are encoded using a transport layer protocol, wherein processing the packet comprises using the transport layer protocol to access data within the packet.

22. The computer readable medium of claim 21, wherein the accessed data comprises at least one of data, status and commands included in payload data encoded using a device layer protocol.

23. A method, comprising:
allocating an available packet buffer in memory to a received packet;
determining whether a number of available packet buffers is less than a first threshold;
determining whether the number of available packet buffers is less than second threshold if the number of available packet buffers is not less than the first threshold; and
copying the received packet from the allocated packet buffer to a copy buffer if the number of available packet buffers is less than the second threshold.

24. The method of claim 23, wherein allocating the available packet buffer and determining whether the number of available packet buffers is less than the first and second thresholds are performed by a device driver executing an operating system and wherein copying the received packet to the copy buffer is performed by a transport protocol driver executing in the operating system.

25. The method of claim 23, further comprising:
releasing the allocated packet buffer after copying the received packet to the copy buffer, wherein the released packet buffer is available to receive an additional packet.

26. The method of claim 23, further comprising:
determining whether a size of the received packet is less than a packet size threshold, wherein the operation to copy the received packet from the allocated packet buffer to the copy buffer if the number of available packet buffers is less than the second threshold is performed if the received packet size is less than the packet size threshold.

27. The method of claim 26, wherein the first threshold is less than the second threshold.

28. The method of claim 23, further comprising:
processing the packets in the packet buffers and copy buffers to access data in the packets; and
releasing the packet buffer including the processed packet to make the released packet buffer available for additional packets.

* * * * *